United States Patent
Adams et al.

(10) Patent No.: US 11,303,192 B2
(45) Date of Patent: Apr. 12, 2022

(54) TORQUE CONVERTER CLUTCH ASSEMBLY FOR HYBRID MODULE

(71) Applicant: Schaeffler Technologies AG & Co. KG, Herzogenaurach (DE)

(72) Inventors: Jonathan Adams, Pittsburgh, OH (US); Kyle Nelson, Wadsworth, OH (US); Victor Norwich, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/088,020

(22) Filed: Nov. 3, 2020

(65) Prior Publication Data

US 2021/0140525 A1 May 13, 2021

Related U.S. Application Data

(60) Provisional application No. 62/933,364, filed on Nov. 8, 2019.

(51) Int. Cl.
| | |
|---|---|
| *F16H 45/02* | (2006.01) |
| *H02K 24/00* | (2006.01) |
| *H02K 11/21* | (2016.01) |
| *B60K 6/26* | (2007.10) |
| *B60K 1/00* | (2006.01) |

(52) U.S. Cl.
CPC ............... *H02K 24/00* (2013.01); *B60K 1/00* (2013.01); *B60K 6/26* (2013.01); *F16H 45/02* (2013.01); *H02K 11/21* (2016.01); *B60K 2006/264* (2013.01); *B60Y 2200/92* (2013.01); *F16H 2045/0221* (2013.01)

(58) Field of Classification Search
CPC ........................ F16H 45/02; F16H 2045/0221
See application file for complete search history.

(56) References Cited

U.S. PATENT DOCUMENTS

| | | | | |
|---|---|---|---|---|
| 2007/0235277 A1* | 10/2007 | Heuler | ................ | F16D 25/0638 192/3.3 |
| 2013/0111891 A1* | 5/2013 | Iwase | .................... | F02B 63/042 60/347 |
| 2019/0178356 A1 | 6/2019 | Vanni | | |
| 2020/0039496 A1 | 2/2020 | Lindemann et al. | | |

* cited by examiner

*Primary Examiner* — Huan Le

(57) ABSTRACT

A torque converter comprises a front cover, an impeller having an impeller shell fixed to the front cover, and a turbine fluidly coupled with the impeller and having a turbine shell. A damper assembly is provided that includes an output flange connected to the turbine shell. A clutch assembly is disposed between the front cover and the turbine. The clutch assembly comprises a piston sealed to the front cover at an outer diameter thereof and a clutch flow deflector plate disposed axially between the piston and the output flange, wherein the clutch flow deflector plate is configured to direct a cooling fluid to the clutch assembly.

14 Claims, 2 Drawing Sheets

TORQUE CONVERTER CLUTCH ASSEMBLY FOR HYBRID MODULE

TECHNICAL FIELD

The present disclosure relates generally to a hybrid module, and more specifically to a torque converter clutch assembly for a hybrid module.

BACKGROUND

Hybrid modules are generally known. Often, it is a challenge to package and/or fit all the desired components, e.g., an e-motor, crank damper, torque converter, torque converter clutch, disconnect clutch, and resolver within the hybrid module architecture due to axial constraints. For example, the available surface area of the torque converter clutch assembly may be limited due to these axial constraints thereby impacting clutch cooling capacity, performance, and energy dissipation.

SUMMARY

Embodiments disclose a torque converter comprising a front cover, an impeller having an impeller shell fixed to the front cover, and a turbine fluidly coupled with the impeller and having a turbine shell. A damper assembly is provided that includes an output flange connected to the turbine shell. A clutch assembly is disposed between the front cover and the turbine. The clutch assembly comprises a piston sealed to the front cover at an outer diameter thereof and a clutch flow deflector plate disposed axially between the piston and the output flange, wherein the clutch flow deflector plate is configured to direct a cooling fluid to the clutch assembly.

In embodiments, the piston is arranged to seal to a transmission input shaft at an inner diameter and an apply chamber is formed between the front cover and the piston for supplying pressurized fluid to engage the clutch assembly. A thrust washer may be connected to the output flange, wherein the clutch flow deflector plate includes an outer portion contacting the piston on a first axial side and an inner portion contacting the thrust washer on a second, opposite axial side. Moreover, a first fluid chamber is formed, at least in part, by the piston, the clutch flow deflector plate, and the output flange and a second fluid chamber is formed, at least in part, by the output flange and a stator of the torque converter. The output flange may include an opening extending axially therethrough and a cooling fluid is supplied to the first chamber from the second chamber via the opening. The cooling fluid is directed from the first chamber to the clutch assembly via a groove defined in the piston. Additionally, the opening in the output flange is located radially inward of the thrust washer.

In other embodiments, the damper assembly includes a first cover plate and a second cover plate supporting a spring therebetween; and the clutch assembly includes an inner clutch plate connected to the first cover plate or the second cover plate. The first cover plate or the second cover plate may include an axially extending tab and the inner clutch plate may be drivingly connected to the axially extending tab. A hybrid module may include the torque converter disclosed herein with an e-motor assembly including a rotor mounted on an outer surface of the front cover and a resolver attached to an impeller hub, wherein the impeller hub is attached to the impeller shell and extends axially therefrom.

In embodiments, a torque converter comprises a front cover, an impeller having an impeller shell fixed to the front cover, and a turbine fluidly coupled with the impeller and having a turbine shell. A damper assembly is provided that includes an output flange connected to the turbine shell and arranged for sealing with a transmission input shaft. A clutch assembly is provided that includes: a piston configured to be axially displaced for engagement of the clutch assembly; a reaction plate fixed to the front cover; and a clutch flow deflector plate connected to the reaction plate and disposed axially between the piston and the output flange, wherein a chamber is formed, at least in part, by the piston, the clutch flow deflector plate, and the output flange for supplying a cooling fluid to the clutch assembly.

In embodiments, the clutch flow deflector plate may be attached to the output flange at an inner end and contact the piston at an outer end. The clutch flow deflector plate may further be attached to the output flange by a thrust washer. The cooling fluid may be supplied from the chamber into the clutch assembly via an axially extending groove defined in the piston and through a tooth interface provided between the clutch flow deflector plate and the reaction plate. The piston may be sealed to the front cover at an outer diameter thereof and arranged for sealing with the transmission input shaft at an inner diameter. An apply chamber may be formed between the front cover and the piston and may be arranged to receive a pressurized fluid for engagement of the clutch assembly.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Due to axial constraints and reduced envelope sizes for hybrid modules, the available surface area of the multi-plate torque converter clutch assembly may be limited, which impacts clutch cooling capacity, performance, and energy dissipation in operating conditions, such as slip conditions. It is thereby an object of the present disclosure to provide embodiments herein that reduce the loss of flow to the clutch and increases clutch performance and cooling capacity without the use or added costs of additional dynamic seals. In particular, embodiments disclosed herein provide for the torque converter clutch plate to act as a flow guide to route or direct cooling fluid flow from the transmission input shaft to the clutch assembly before reaching the torus of the torque converter.

Figure 1:
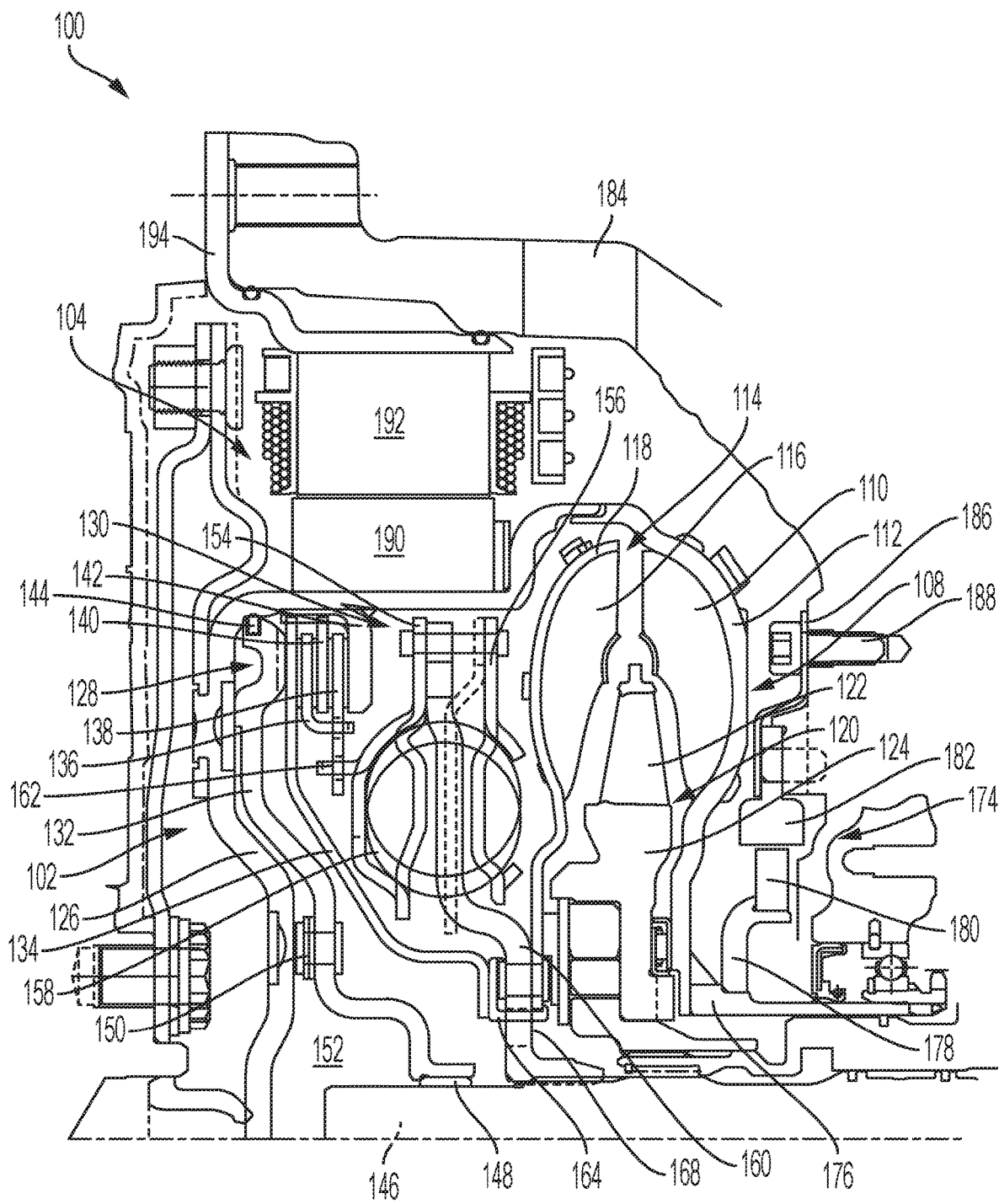
FIG. 1 shows a cross-sectional view of a hybrid module according to an embodiment of the present disclosure.
Figure 2:
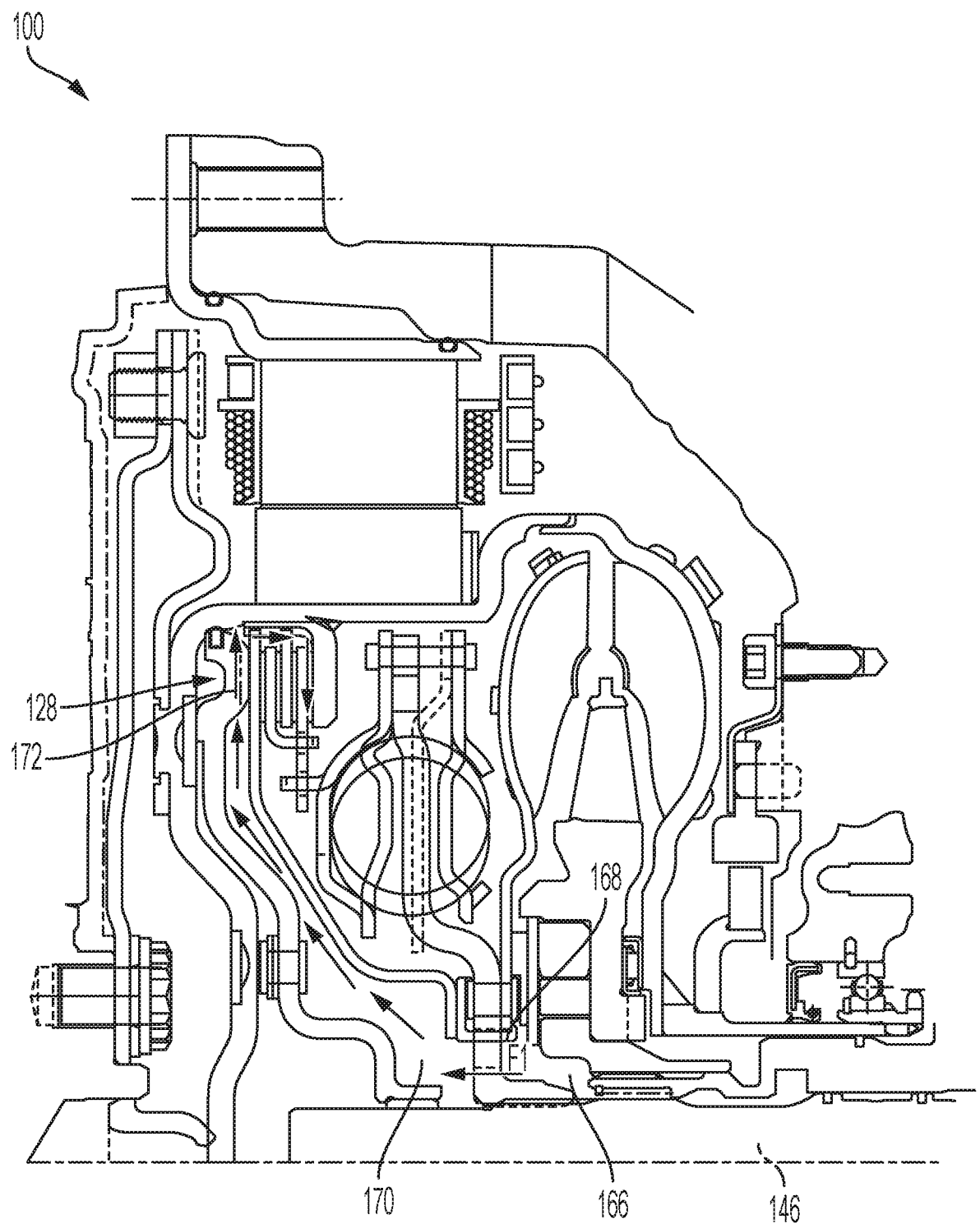
FIG. 2 shows a torque converter clutch cooling flow for the hybrid module shown in FIG. 1.

FIG. 1 shows a cross-sectional view of hybrid module 100 according to an embodiment of the present disclosure. FIG. 2 shows a torque converter clutch cooling flow for hybrid module 100. The following description is made in view of FIGS. 1-2. Hybrid module 100 includes torque converter 102 and e-motor assembly 104. Torque converter 102 includes: impeller assembly 108 having a plurality of blades 110 attached to impeller shell 112; turbine assembly 114 having a plurality of blades 116 attached to turbine shell 118; and stator assembly 120 having blades 122 supported by stator body 124. Impeller shell 112 may be connected or fixed to front cover 126, for example, via a welded connection. Impeller shell 112 and front cover 126 may form the housing or enclosure of torque converter 102.

Torque converter 102 further includes clutch assembly 128 and damper assembly 130. Clutch assembly 128 may include: piston 132; clutch flow deflector plate 134; inner clutch plate 136; inner clutch plate 138; outer clutch plate 140; and reaction plate 142. Piston 132 is disposed axially between clutch flow deflector plate 134 and front cover 126. Piston 132 may be sealed at an outer diameter thereof to front cover 126 via seal 144 and arranged to be sealed to a transmission input shaft 146 by bushing 148 at an inner diameter thereof, for example. Piston 132 may further be non-rotatably connected to front cover 126 by leaf springs 150. An apply chamber 152 is thereby formed between front cover 126, piston 132, and seal 144 and arranged to receive pressurized fluid for lock-up or engagement of clutch assembly 128 to transfer torque therebetween. Inner clutch plates 136, 138 may be connected to each other at an inner diameter, for example, by a tabbed connection. Clutch flow deflector plate 134 and outer clutch plate 140 may be connected to reaction plate 142 at outer diameters thereof, for example, via a tooth interface. Reaction plate 142 may be fixed to front cover 126, for example via welding. Clutch flow deflector plate 134, inner clutch plate 136, inner clutch plate 138, and outer clutch plate 140 may be disposed axially between piston 132 and reaction plate 142. That is, pressurized fluid may be supplied to apply chamber 152 from transmission input shaft 146 to axially displace piston 132 to compress clutch flow deflector plate 134, inner clutch plate 136, inner clutch plate 138, and outer clutch plate 140 against reaction plate 142 to engage clutch assembly 128.

Damper assembly 130 includes: first cover input plate 154; second cover input plate 156; springs 158 supported between first and second cover plates 154, 156; and output flange 160. First cover input plate 154 may be drivingly engaged with inner clutch plates 136, 138, for example, by axially extending tab 162. Output flange 160 may be connected to turbine shell 118 and arranged to be fixed to transmission input shaft 146. Thrust washer 164 may be attached to output flange 160 on an axial side facing front cover 126. Clutch flow deflector plate 134 may be disposed axially between piston 132 and output flange 160 such that a first axial side contacts piston 132 at an outer end and a second, opposite axial side contacts thrust washer 164 at an inner end.

Clutch flow deflector plate 134 is configured and arranged to direct or route cooling fluid F1 from transmission input shaft 146 to and around clutch assembly 128 (see FIG. 2, for example). That is, cooling fluid F1 is supplied from transmission input shaft 146 to chamber 166 formed between stator assembly 120 and output flange 160. From chamber 166, cooling fluid F1 is routed through holes or openings 168 defined in output flange 160 into chamber 170 formed between clutch flow deflector plate 134, piston 132, and output flange 160. Cooling fluid F1 is then routed through chamber 170 to clutch assembly 128 via flow path 172 defined in piston 132. Flow path 172 may extend axially within piston 132 and may be formed as a groove that is machined or stamped, for example. That is, cooling fluid F1 flows up through flow path 172 in piston 132 and then through the tooth interface provided between reaction plate 142 and clutch flow deflector plate 134 and outer clutch plate 138. Some of the teeth in this tooth interface may be purposefully removed for targeted cooling flow therethrough. Cooling fluid F1 is then dispersed through clutch facings or surfaces of clutch flow deflector plate 134, inner clutch plate 136, inner clutch plate 138, and outer clutch plate 140. Cooling fluid F1 exits the inner diameter of the clutch facings or surfaces of clutch flow deflector plate 134, inner clutch plate 136, inner clutch plate 138, and outer clutch plate 140, which may be grooved surfaces to facilitate fluid flow therethrough.

Hybrid module 100 further includes resolver assembly 174 attached to impeller hub 176 of torque converter 102 via rotor mounting ring 178. Impeller hub 176 is connected to impeller shell 112, for example, via a welded connection and extends axially therefrom. Rotor mounting ring 178 is fixed to an outer surface of impeller hub 176, for example, via a press-fit connection. Resolver assembly 174 further includes rotor 180 and stator 182. Rotor 180 is fixed to rotor mounting ring 178, for example, via a press-fit connection. Stator 182 is fixed to transmission housing 184 via plate 186 and connector 188, for example, a bolt. That is, connector 188 fixes plate 186 to transmission housing 184 and stator 182 is clamped therebetween. Connector 188 is disposed radially outside of stator 178.

Hybrid module 100 further includes e-motor assembly 104 having rotor 190 and stator 192. Rotor 190 may be comprised of multiple segments and mounted on an outer surface of front cover 126 of torque converter 102. That is, front cover 126 acts as a rotor carrier to support rotor 190. Stator 192 is likewise installed on stator ring 194.

Embodiments disclosed herein provide several advantages including reducing the loss of flow to the clutch due to hybrid module axial constraints and increasing clutch performance and cooling capacity in operating conditions. Additionally, the thrust path is advantageously designed such that a thrust path is created from the turbine assembly to the clutch flow deflector plate before reaching the torque converter clutch cover assembly to allow additional area for packaging. Whereas, in traditional torque converter designs, the thrust path may go through the turbine hub requiring more area that may be challenging to fit within smaller envelopes for hybrid modules.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 torque converter
104 e-motor assembly
108 impeller assembly
110 blades
112 impeller shell
114 turbine assembly
116 blades
118 turbine shell
120 stator assembly
122 blades
124 stator body
126 front cover
128 clutch assembly
130 damper assembly
132 piston
134 clutch flow deflector plate
136 inner clutch plate
138 inner clutch plate
140 outer clutch plate
142 reaction plate
144 seal
146 transmission input shaft
148 bushing
150 leaf springs
152 apply chamber
154 first cover input plate
156 second cover input plate
158 springs
160 output flange
162 tab
164 thrust washer
166 chamber
168 openings
170 chamber
172 flow path
174 resolver
176 impeller hub
178 stator
178 rotor mounting ring
180 resolver
180 transmission housing
182 stator
184 connector
184 transmission housing
186 fixes plate
186 plate
188 connector
190 support rotor
190 rotor
192 stator
194 stator ring

What is claimed is:

1. A torque converter, comprising:
   a front cover;
   an impeller having an impeller shell fixed to the front cover;
   a turbine fluidly coupled with the impeller and having a turbine shell;
   a damper assembly including an output flange connected to the turbine shell;
   a clutch assembly disposed between the front cover and the turbine, the clutch assembly comprising:
      a piston sealed to the front cover at an outer diameter thereof; and
      a clutch flow deflector plate disposed axially between the piston and the output flange, wherein the clutch flow deflector plate is configured to direct a cooling fluid to the clutch assembly; and
   a thrust washer connected to the output flange, wherein the clutch flow deflector plate includes an outer portion contacting the piston on a first axial side and an inner portion contacting the thrust washer on a second, opposite axial side.

2. The torque converter of claim 1, wherein the piston is arranged to seal to a transmission input shaft at an inner diameter and an apply chamber is formed between the front cover and the piston for supplying pressurized fluid to engage the clutch assembly.

3. The torque converter of claim 1, wherein a first fluid chamber is formed, at least in part, by the piston, the clutch flow deflector plate, and the output flange and a second fluid chamber is formed, at least in part, by the output flange and a stator.

4. The torque converter of claim 3, wherein the output flange includes an opening extending axially therethrough and a cooling fluid is supplied to the first fluid chamber from the second fluid chamber via the opening.

5. The torque converter of claim 4, wherein the cooling fluid is directed from the first fluid chamber to the clutch assembly via a groove defined in the piston.

6. The torque converter of claim 4, wherein the opening in the output flange is located radially inward of the thrust washer.

7. The torque converter of claim 1, wherein:
   the damper assembly includes a first cover plate and a second cover plate supporting a spring therebetween; and
   the clutch assembly includes an inner clutch plate connected to the first cover plate or the second cover plate.

8. The torque converter of claim 7, wherein the first cover plate or the second cover plate includes an axially extending tab and the inner clutch plate is connected to the axially extending tab.

9. A hybrid module comprising:
   a torque converter comprising:

a front cover;
an impeller having an impeller shell fixed to the front cover;
a turbine fluidly coupled with the impeller and having a turbine shell;
a damper assembly including an output flange connected to the turbine shell; and
a clutch assembly disposed between the front cover and the turbine, the clutch assembly including:
  a piston sealed to the front cover at an outer diameter thereof; and
  a clutch flow deflector plate disposed axially between the piston and the output flange, wherein the clutch flow deflector plate is configured to direct a cooling fluid to the clutch assembly,
an e-motor assembly including a rotor mounted on an outer surface of the front cover; and
a resolver attached to an impeller hub, wherein the impeller hub is attached to the impeller shell and extends axially therefrom.

10. A torque converter, comprising:
a front cover;
an impeller having an impeller shell fixed to the front cover;
a turbine fluidly coupled with the impeller and having a turbine shell;
a damper assembly including an output flange connected to the turbine shell and arranged for sealing with a transmission input shaft; and
a clutch assembly comprising:
  a piston configured to be axially displaced for engagement of the clutch assembly;
  a reaction plate fixed to the front cover; and
  a clutch flow deflector plate connected to the reaction plate and disposed axially between the piston and the output flange, wherein a chamber is formed, at least in part, by the piston, the clutch flow deflector plate, and the output flange for supplying a cooling fluid to the clutch assembly, wherein the cooling fluid is supplied from the chamber into the clutch assembly via an axially extending groove defined in the piston and through a tooth interface provided between the clutch flow deflector plate and the reaction plate.

11. The torque converter of claim 10, wherein the clutch flow deflector plate is attached to the output flange at an inner end and contacts the piston at an outer end.

12. The torque converter of claim 11, wherein the clutch flow deflector plate is attached to the output flange by a thrust washer.

13. The torque converter of claim 11, wherein an apply chamber is formed between the front cover and the piston and is arranged to receive a pressurized fluid for engagement of the clutch assembly.

14. The torque converter of claim 10, wherein the piston is sealed to the front cover at an outer diameter thereof and arranged for sealing with the transmission input shaft at an inner diameter.

* * * * *